Patented May 29, 1934

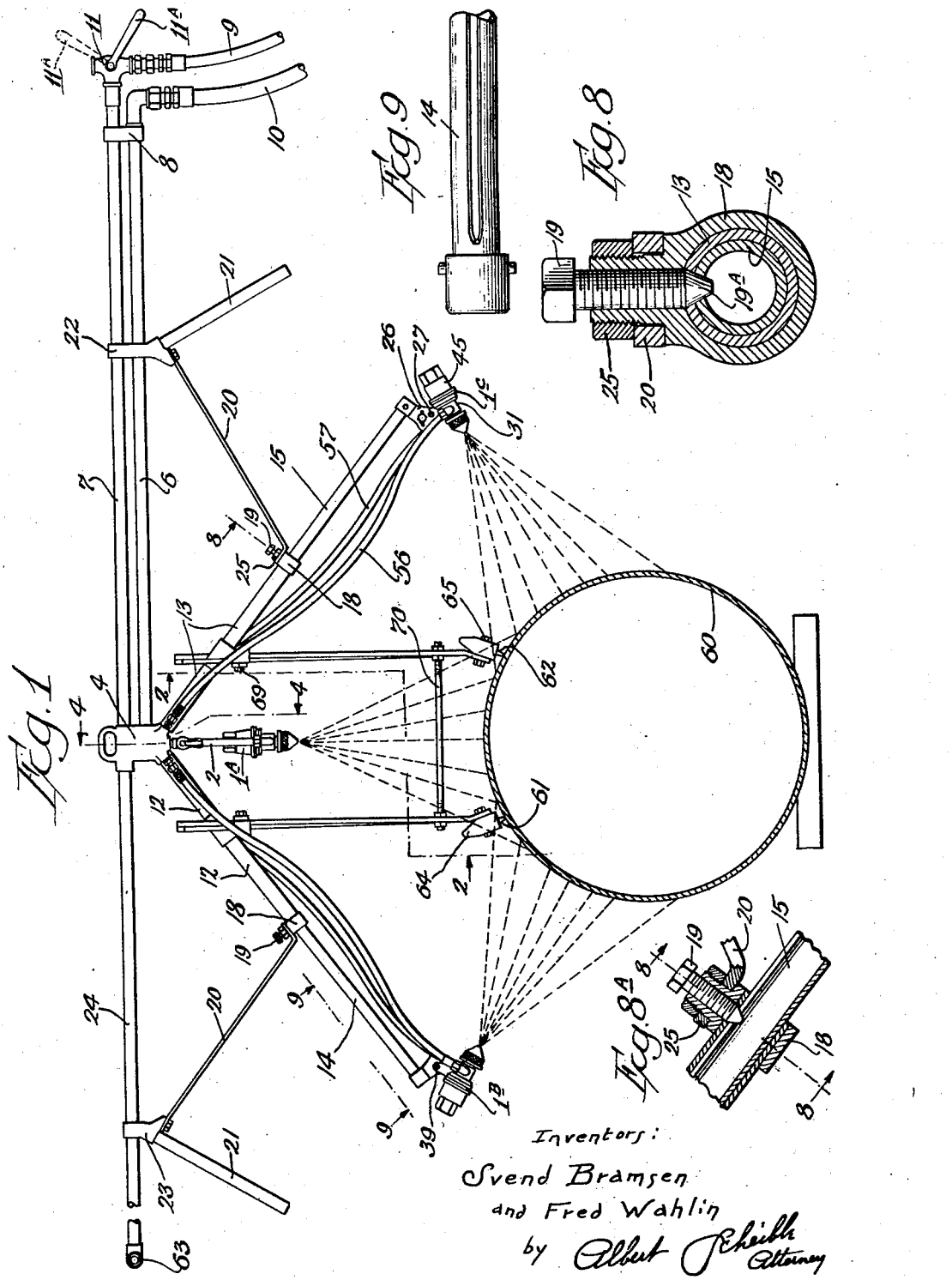

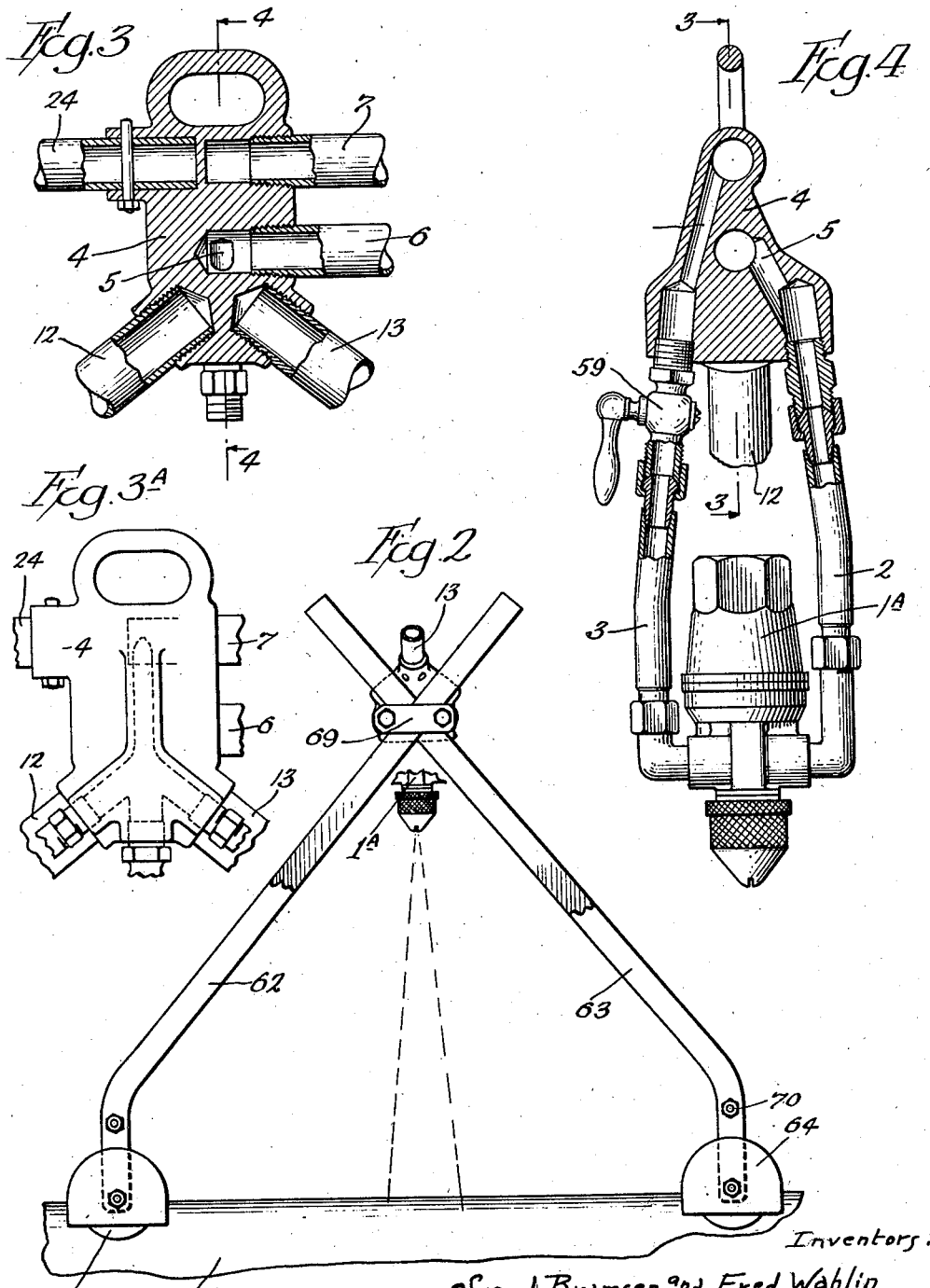

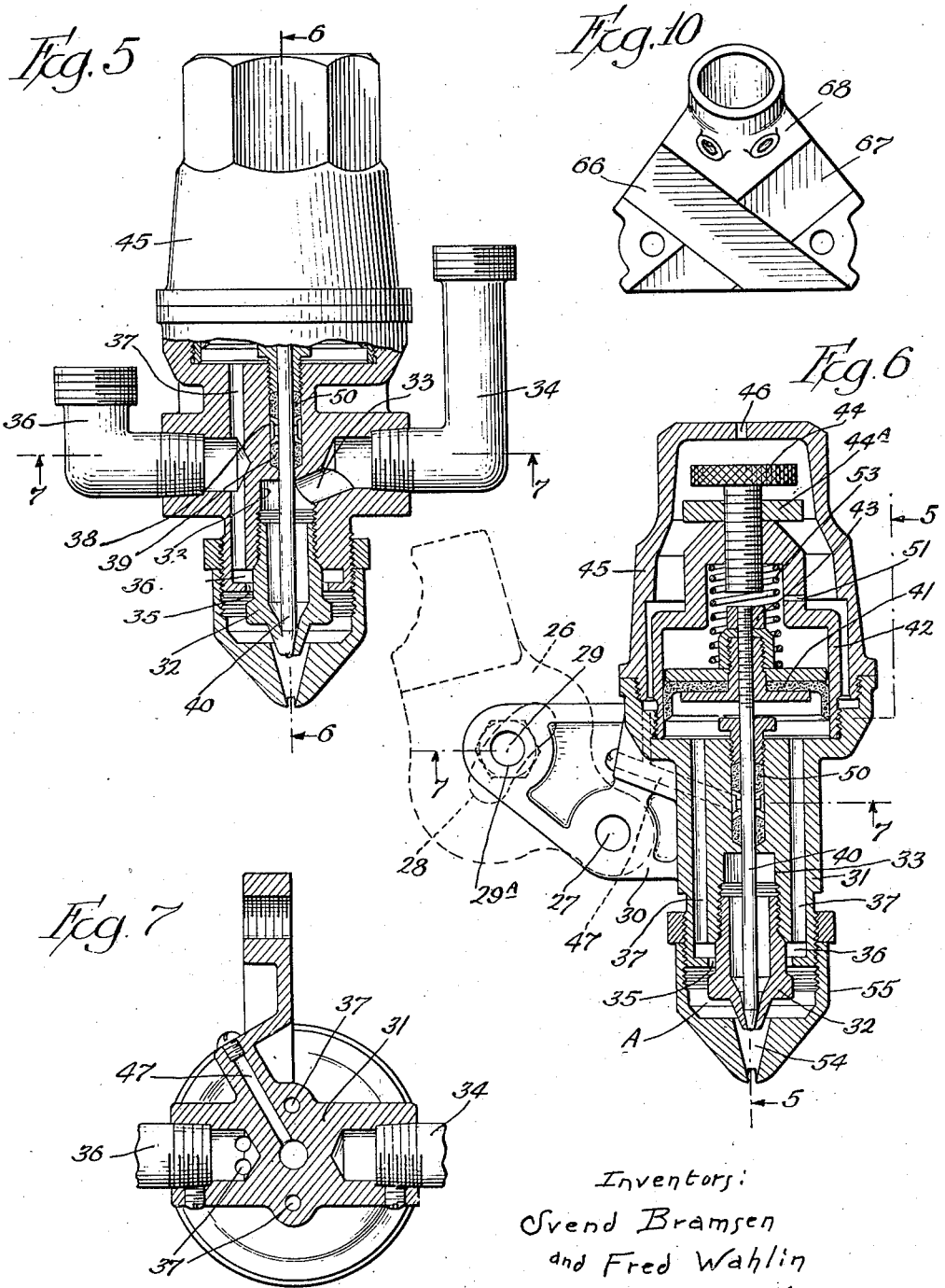

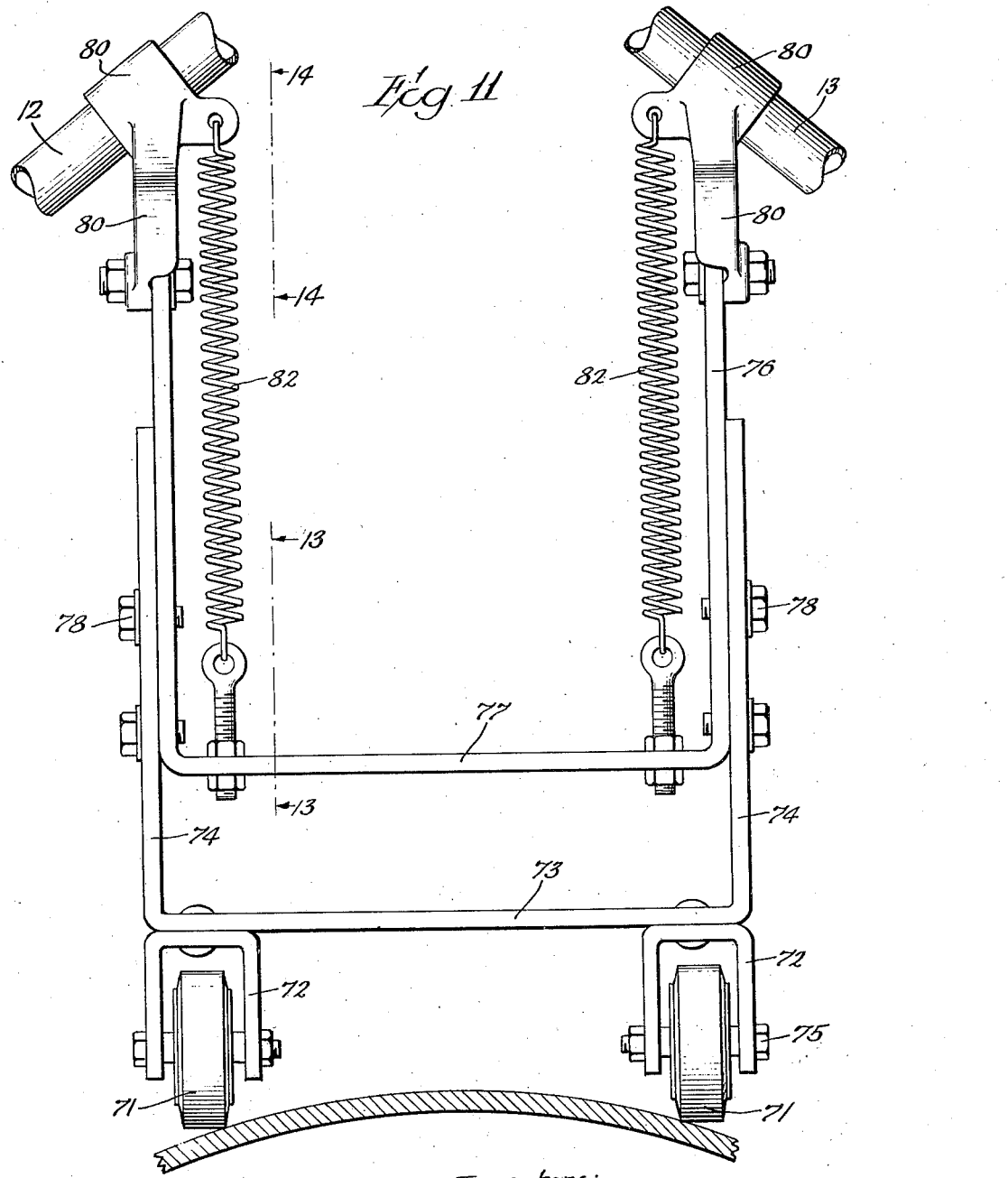

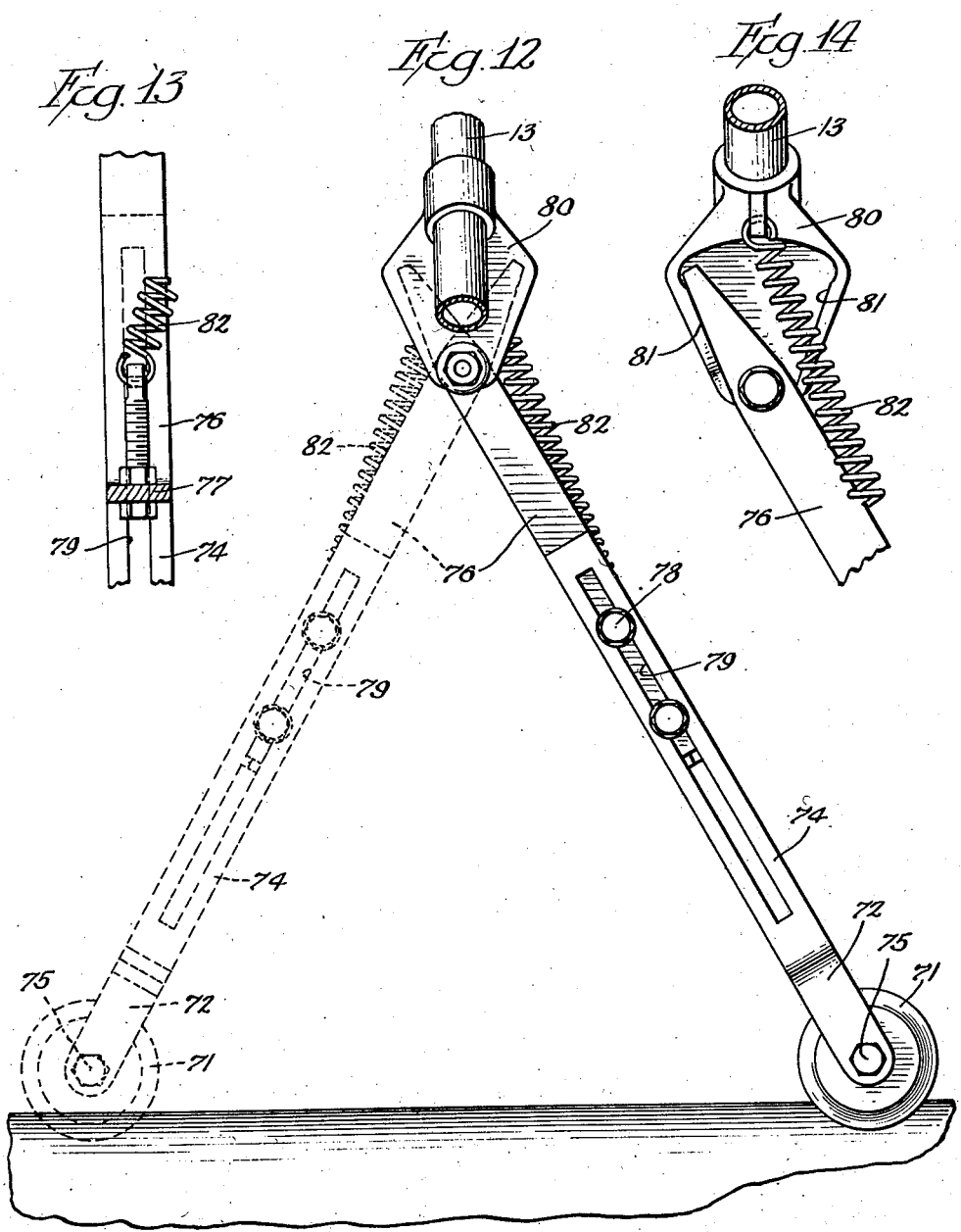

1,960,725

UNITED STATES PATENT OFFICE 1,960,725

PIPE SPRAYING APPLIANCE

Svend Bramsen and Fred Wahlin, Chicago, Ill., assignors to Binks Manufacturing Company, Chicago, Ill., a corporation of Delaware Application December 14, 1931, Serial No. 580,941

19 Claims. (Cl. 91—45)

Our invention relates to means for spraying liquid coating materials upon the exteriors of cylindrical or prismatic tubes, columns and the like; as for example, for the exterior spray-coating of pipes or conduits.

In some of its general objects, our invention aims to provide simple and easily manipulated means whereby the coating material may be sprayed either upon a single longitudinal strip portion; or may simultaneously be sprayed upon two or more laterally adjacent portions of the surface of the object, as for example a group of adjacent portions extending half way around a tube; whereby the devices for projecting the several sprays can easily be adjusted both as to the directions in which the axes of the sprays will extend and as to the distances of the spray devices from the surface of the object; and whereby the spray devices can easily be conjointly moved longitudinally of the object while maintaining the said adjustments and while continuously maintaining the axis of each spray device in a given plane diameter of the object.

In some additional objects, our invention aims to provide simple, relatively light and easily manipulated means for movably supporting such a group of spray devices, together with the ducts for supplying the liquid coating material and the compressed air for atomizing this material, upon the object which is to be coated; and for preventing a bodily movement of such a group of devices about the axis of the object while these devices are conjointly moved longitudinally of the object. For this purpose, our invention aims to provide supporting means having spaced pairs of object-engaging wheels adapted to roll upon the object, and aims to provide such supporting means as part of a unitary spray-device and supply-duct assembly adapted to be lifted bodily on and off the object when the axis of the object is approximately horizontal.

In a further object, our invention aims to provide simple means for adjusting the spacing between the pairs of wheels, for adjusting the relative angular relation of the several spray devices, and for locking each of the said adjustments.

Furthermore, our invention aims to arrange portions of the supporting means so as to permit a convenient and independent adjustment of each spray device both as to the distance of that device from the object and as to direction of the axis of the spray projected by that device.

Moreover, our invention aims to dispose portions of such an assembly so that these can conveniently be grasped by the operators for moving the entire assembly longitudinally of the object and for cooperating with the said wheels in guiding the assembly.

In some additional objects, our invention aims to provide simple and convenient means for supplying both the coating material and the compressed air simultaneously to all of the spray devices; aims to provide for an easy detaching and reattaching of each spray device; and aims to provide simple means whereby the supply of compressed air to each device can be utilized after the completion of the spraying to force the residual coating material out of the spray devices and out of the material ducts which form part of the previously recited assembly.

More particularly, our invention aims to provide a spraying assemblage including three spray devices and arranged so that all three of these devices can readily be adjusted to direct sprays having spray axes substantially radial of the axis of the object which is being sprayed, and so that the three devices can be adjusted for causing the edge portions of the adjacent projected sprays to overlap to a desired extent; as for example, so that the combined sprays from the three devices will project the coating material upon fully half of the periphery of the object, thereby permitting the entire coating to be effected with two longitudinal passages of our assembly over the object without requiring any intervening readjustment of any portion of the assembly.

Still further and also more detailed objects will appear from the following specification and from the accompanying drawings, in which Fig. 1 is a front elevation of a pipe-spraying appliance embodying our invention, showing this as adjusted so that three spray devices will conjointly coat half the periphery of a pipe.

Fig. 2 is an enlarged transverse vertical section, taken along the line 2—2 of Fig. 1.

Fig. 3 is a still more enlarged vertical section, taken along the line 3—3 of Fig. 4 through the duct-connecting casting.

Fig. 3A is an enlarged side elevation of the duct-connecting casting and parts adjacent to it.

Fig. 4 is a vertical section taken along the line 4—4 of Fig. 1 and drawn on the same scale as Fig. 3.

Fig. 5 is an enlargement of the central spray device in Fig. 1, which also forms the lower portion of Fig. 4, with parts thereof sectioned along the line 5—5 of Fig. 6.

Fig. 6 is an enlarged central, vertical and longitudinal section through one of the side spray devices in Fig. 1, taken in the general plane of that figure, with dotted lines showing the bracket upon which this device is pivoted.

Fig. 7 is a horizontal section taken through the body casting of the side spray device of Fig. 6, taken along the line 7—7 of Fig. 6.

Fig. 8 is an enlarged section taken along the line 8 of Figs. 1 and 8A.

Fig. 8A is a sectional view of Fig. 8 taken at right angles to Fig. 8.

Fig. 9 is an enlarged and fragmentary plan view taken from the line 9—9 in Fig. 1.

Fig. 10 is an enlarged elevation of the leg guide of Fig. 2.

Fig. 11 is a fragmentary view of another form of supporting means suitable as part of our coating apparatus, looking longitudinally of the pipe on which it travels.

Fig. 12 is a side elevation of the supporting arrangement shown in Fig. 11.

Figs. 13 and 14 are fragmentary elevations taken respectively from the lines 13—13 and 14—14 of Fig. 11.

In the illustrated embodiment, our pipe spraying appliance includes three counterpart sprayheads of the socalled "internal atomization" type in which the liquid coating material is intermingled with the air within the spray-head and discharged as an atomized spray of conical form, this coating material being hereafter termed "paint". Moreover, our appliance is shown in an embodiment particularly suited for use in employing the Method of spraying pipes as disclosed in the Bramsen and Sausen Application #515,704, filed February 14, 1931.

The central spray-head 1 is supported (as in Fig. 2) by the air duct 3 and the material duct 2 leading to it, which ducts depend from a fitting 4 which is cored out to provide an air passage 5 and a paint passage 6. Threaded into this fitting 4 and preferably disposed one above the other, with their axes in a plane taken through the axis of the central spray head 1 and at right angles to the common plane of the axes of the ducts 2 and 3, are two pipes, namely an air pipe 7 leading to the said air passage and a paint pipe 6.

The outer end portions of the pipes 6 and 7 are held in parallel relation by a second fitting 8 through which they both extend, and fluid is supplied to these pipes respectively by an air hose 9 and a paint hose 10, the supply of air to the air pipe 7 being controlled by a three-way valve 11 interposed between this pipe and the air hose.

Threaded into the fitting 4 are two downwardly diverging tubular arms 12 and 13 which have their axes in the same vertical plane with the axis of the air and paint pipes 6 and 7. Each of these arms has an extension pipe (14, 15) extending slidably into it, and each such extension pipe has a longitudinal slot 16 in its upper edge as shown in Fig. 9. Sleeved upon the outer end of each of the arms 12 and 13 is a collar 18 which is kept from moving with respect to the adjacent arm by a screw 19 (Fig. 8) extending slidably through a bore in the collar, this screw having a tapering tip 19A engaging the side walls of the slot 16 in the corresponding extension pipe to prevent the latter from rotating in the tubular arm into which that pipe extends.

Each screw 19 extends also through a perforation in the lower end of brace 20 which has its upper end fastened to a perforated casting carrying a depending handle 21. One such casting 22 has both the air pipe 7 and the paint pipe 6 extending through it, while the other casting 23 fits over a pipe 24 which is threaded at one end into the fitting 4. This pipe 24 desirably extends in alinement with the air pipe 7, and the lower end of each brace 20 is clamped against the adjacent sleeve 18 by a nut 25, as shown in Fig. 8.

Pinned to the outer end of each extension pipe (14 or 15) is an end casting 26 (Fig. 6) upon which one of the laterally disposed spray appliances is pivoted on a pin 27 (Figs. 1 and 6) extending at right angles to the common plane of the companion diverging extension pipes 14 and 15. To provide for this pivoting and for a locked adjustment of the angle between the axis of the extension pipe and the axis of the spray appliance, we dispose the pivot pin 27 near the lower end of the end casting 26 and provide that casting nearer to the said pipe with an arcuate slot 28, as shown in Fig. 6. Then we provide a bolt 29 extending through this slot and through a bore in a bracket 30 on the body 31 of the spray appliance, through which bracket the pivot pin 27 also extends.

Each of the spray appliances, as sectioned in Figs. 5 and 6, is preferably of an inner-mix type including a liquid nozzle 32 screwed into the forward end of the appliance body 31, the bore of this liquid nozzle being connected by a body passage 33 to a liquid inlet nipple 34. The liquid nozzle projects freely through the forward opening 35 of an air chamber 36 formed in the forward end of the appliance body, this chamber being connected to an air inlet nipple 36 by air passageways including an air duct 37 which extends longitudinally of the body 31 entirely through the latter.

In the body 31, the axial bore which forms part of the liquid passage 33 also includes a rearward portion 38 housing two spaced packings 50 through which the liquid-controlling needle valve 40 extends, and this needle valve is fastened behind the said body to a piston assembly 41 which slides in the forward portion of a generally cupshaped member 42 threaded on the body 31. The piston assembly desirably includes as its most rearward portion a locknut 43 which latches the needle valve to that assembly and which is disposed for engaging a stop screw 44 threaded through the rear end (or cup bottom) of the member 42 in which the piston slides.

A cap 45 houses the said member 42 and the stop screw, this cap being freely spaced from the member 42 so as to leave an air space between them. This cap has a port 46 in its outer end and the space between the cup-shape pistonguiding member 42 and the forward portion of the cap 45 is connected by a passage 47 to the part of the bore portion 49 which is between the two packings 50, thereby permitting any fluid between these packings to be expelled through the cap port 46. The member 42 also has a lateral port 51 leading to the interior of the cap, so as to connect the outer air with the interior of the cap behind the piston assembly.

The piston assembly is urged forwardly by a spring 53 interposed between this assembly and the end of the cap, which spring continuously tends to hold the needle valve in the position (shown in Figs. 5 and 6) in which that valve shuts off the discharge of liquid from the liquid nozzle 32. When air is admitted through the air inlet 36, part of this air passes forwardly through the air passage 37 and the air chamber 36, and alongside the liquid nozzle, to the spray discharge outlet 54 of a mixing nozzle 55. This mixing nozzle is threaded on the forward end of the appliance body 1 coaxial with the liquid nozzle and has its forward end sufficiently spaced from the forward end of the body and from the liquid nozzle to afford an air chamber A which permits air to flow around the liquid nozzle.

Part of the air admitted to the body passage 37 also flows rearwardly into the interior of the cup-shaped member 42 so as to move the piston outwardly against the resistance of the spring 52, thereby retracting the needle valve 40, so that the discharge of liquid is automatically controlled conjointly with the discharge air by the control of the air supply to the spray appliance.

Each of the lateral or arm-supported spray heads has its air inlet nipple 36 connected by an air hose 56 to the air passage 57 in the fitting 4 (Figs. 3 and 4) which passages leads from the air tube 7; and a material hose 58 similarly connects each liquid inlet 34 with a branched passage 5 leading from the liquid tube 6.

Since the central spray heads 1A require no adjustment in the position of its axis, these can be suspended from the same fitting 4 with the corresponding air and liquid ducts; for which a short air hose 3 and a short liquid material hose 2 will suffice, as shown in Fig. 4. However, a valve 59 is provided between the air hose 3 and the said fitting 4, so that the central spray head 1A can be shut off when the width of the pipe portion against which the spray is to be directed is such that this can be covered by the slightly overlapping sprays from the two laterally disposed spray heads 1B and 1C alone.

To support and guide such a fluid pipe and triple spray heads from the pipe which is to be sprayed, we provide a supporting carriage having two pairs of pipe-engaging wheels at the lower ends of two pairs of legs, which legs can be adjusted to vary the spacing between the spray head assembly and the pipe.

In Figs. 1 and 2, this supporting assemblage includes two pairs of legs 62 and 63, each leg having its lower end clamped against a wheel hood 64 by a bolt 65 upon which a wheel 61 is journaled. The legs of each pair respectively slidable in grooves 66 and 67 formed in a casting 68, (Fig. 10) which is clamped to one of the spray-head-supporting arms 13 or 14, and the two legs are clamped to that casting in their adjusted position by a clamp-piece 69 shown in Figs. 1 and 2. The legs at the same side of the pipe are rigidly connected by a bolt 70, so as to keep the wheels of each pair from spreading apart.

Each leg is preferably bent so as to dispose the general plane of each wheel approximately radial of the pipe, and each wheel preferably has a relatively sharp peripheral edge to deter it from sliding laterally of the pipe and also to reduce the marring of the freshly applied spray by the wheel to a negligible extent.

With the supporting assemblage thus constructed, the height of the spray-head assemblage can readily be adjusted initially so that the spray from the central spray head will cover a trifle more than one third the width of the stripe which is to be coated at one operation. Then the distance to which each pipe extension (14 or 15) holds an outer spray-head from the central one, together with the inclination of the axis of each outer spray-head to the axis of the central spray-head is also adjusted so that the spray from each of these laterally disposed spray devices will cover one lateral third of the desired strips, a slight overlapping of the sprays being desirable to offset the thinning of the conical spray near its edges. This adjustment is readily made for any given size of pipe after the handle 11A has been moved to the position shown in dotted lines in Fig. 1 so as to start the spraying, after which no further adjustment is needed for the same size of pipe.

When constructed and adjusted as heretofore described, the entire assemblage can readily be lifted as a unit by two men, one of whom grasps the handle end (or right-hand end in Fig. 1) of the horizontal supply pipes, while the other grasps the extension pipe 24, so as to set the entire carriage on the pipe 60 which is to be sprayed. This can be done while the two supply hoses 9 and 10 are connected to an engine-driven air compressor and liquid material tank outfit of any customary type (not here shown), such an outfit being on a truck run alongside the pipe, and the length of the hose lines being sufficient to maintain the connections while our appliance is being pushed from one end of the pipe to the other.

When the carriage is then pushed along the pipe, the convergence of the medial planes of the rollers 61 prevents these from sliding circumferentially of the pipe; consequently, the carriage is readily guided by the two spaced pairs of rollers in a direction purely longitudinal of the pipe and with the axis of the central spray head 1A continually in the same plane. To facilitate this pushing, each operator can grasp one of the handles 21 with one hand; and the operator near the end of the extension pipe 24 can grasp a cross-handle 63, while the other operator can grasp any desired portions of the valved end of the upper pipe assembly.

In practice, a number of pipes can be supported in horizontal alinement end to end to form a pipe row of a length proportioned to the rate at which the sprayed material dries. For example, in spraying asphaltum coatings on thirty foot lengths of pipes (as now used for natural gas), three such pipes may be positioned end for end by suitable helpers. As soon as our spray apparatus had sprayed one section of the circumference of all three pipes for the joint length of these pipes, one operator shuts off the air valve 11 and the two operators raise the apparatus off the last pipe while the helpers lift and rotate that pipe through a suitable angle.

As soon as all three pipes have thus been partially rotated, the air control valve is again opened and our apparatus is pushed in the opposite direction for the entire length of the pipes, so as to spray a second section of each pipe. With large pipes, our apparatus is preferably adjusted so that each spraying covers a third of the circumference of the pipes, so that the last needed travel of our apparatus over the pipes leaves that apparatus at the opposite end of the row of pipes from the starting end and ready to start on the meanwhile positioned next row of pipes.

Since the truck carrying the air compressor and the liquid material tanks can readily move along from one such pipe row to another, our apparatus permits long total lengths of pipes to be sprayed in a day by relatively few men. Moreover, since the spray heads can readily be adjusted (both as to spread of the roller-carrying legs 62 and 3 and as to the relative angularity between the axes of the spray heads) for a small overlapping of the spray from adjacent spray heads, our apparatus will readily provide a coating which is substantially uniform circumferentially as well as longitudinally of each pipe.

This uniformity of the coating is enhanced by our employing an air control valve 11 of a three-way type, which vents the air pipe 7 and the air connections to the spray heads whenever the valve is closed at the end of each travel of the apparatus. Owing to this venting, the emission of spray from each spray head is discontinued almost instantly after the air control valve is closed, so as not to thicken the coating at the end portions of the row of pipes.

However, while we have heretofore described our invention in an embodiment including a certain type of spray head and a practical construction of the adjustable supporting arrangement, we do not wish to be limited to the previously disclosed details of construction and arrangement, since many changes might be made without departing either from the spirit of our invention or from the appended claims.

For example, when the workmen have once been trained to keep the common plane of the spray-head supporting arms vertical, our appliance can be employed effectively with only a single pair of supporting wheels 71, as shown in Figs. 11 to 14. In these figures, each wheel is journaled on an axle 75 extending through a stirrup 72, and both stirrups are fastened to the back 73 of a U-shaped member which has its U-shanks 74 respectively overlapping the shanks 76 of another U-shaped member 77, the said overlapping shanks being connected by bolts 78 each extending through a slot 79 in one shank. Thus arranged, portions of each two overlapping shanks form a leg which can be adjusted in length to vary the spacing between the wheels and the castings 80 which respectively connect the upper shanks 76 to the diverging arms 13 and 14 of our appliance.

With this type of supporting arrangement, we have found it feasible to pivot the upper shanks 76 to the castings 80, to provide each such casting with shoulders 81 for limiting the pivotal movement of the said upper shanks, and to interpose a spring 82 between each upper shank and the adjacent casting 80 so as to hold a part of that shank against one or the other of the said shoulders. Thus arranged, the twin-wheeled leg assembly can be swung readily from the position shown in full lines in Fig. 12 to that shown in dotted lines in the same figure, so as to reverse the direction in which the legs slope, at each end of the traversing of the pipe which is being sprayed.

We claim as our invention:

1. In an appliance for spray-painting a stationary horizontal pipe or the like, a movable and rigid supporting structure, a pair of wheels spaced circumferentially of and seated upon the pipe, the wheels being pivoted upon lower portions of the structure and each having its axis in a plane transverse of the axis of the pipe; a plurality of spray means supported by the said structure and disposed for projecting sprays of liquid material respectively against laterally adjacent portions of the pipe along spray axes disposed in a common plane at right angles to the axis of the pipe; and means for adjusting at least two of the spray means both as to the direction of the axes thereof and the distance from the pipe while maintaining the axes of all of the spray means in the said common plane.

2. A pipe spraying appliance as per claim 1, including a liquid supply duct and an air supply duct both supported by the said structure, and means supported by the said structure for connecting each of the said ducts with all of the spray means.

3. A pipe spraying appliance as per claim 1, in which the structure includes a lifting member extending above the spray means in a plane at right angles to the axis of the pipe and parallel to a line connecting the pipe-engaging edges of the said wheels.

4. A pipe spraying appliance as per claim 1, in which the structure includes a lifting member extending above the spray means in a plane at right angles to the axis of the pipe and in the same common plane with the axes of the spray means.

5. A pipe spraying appliance as per claim 1, in which the structure includes piping fast with respect to the said structure and extending transversely of the pipe beyond both sides of the pipe; the said piping serving as means whereby the entire appliance may be lifted on and off the pipe and may be pushed along the pipe, and two portions of the piping serving respectively as an air supply duct and as a liquid supply duct.

6. A pipe spraying appliance as per claim 1, in which the structure includes piping fast with respect to the said structure and extending transversely of the pipe beyond both sides of the pipe; the said piping serving as means whereby the entire appliance may be lifted on and off the pipe and may be pushed along the pipe, and two portions of the piping serving respectively as an air supply duct and as a liquid supply duct, the said portions extending at the same side of the axis of the pipe and parallel to a line connecting the pipe-engaging edges of the said wheels.

7. A pipe painting device as per claim 1, in which the said structure includes leg portions normally latched to each other and adjustable with respect to each other for simultaneously lowering or raising all of the spray devices with respect to the said wheels.

8. A portable appliance for spray-painting a horizontal pipe or the like, comprising a carriage having two pairs of wheels seated on the pipe, the said pairs of wheels being spaced longitudinally of the pipe and the wheels of each pair having their axes in a common plane at right angles to the axis of the pipe; two arms diverging downwardly from a portion of the carriage above a point approximately central with respect to all four wheels; and two pneumatically operable spray devices respectively supported by the outer ends of the said arms with the axes of the said devices converging downwardly; the two spray devices and the two arms having their axes in a common vertical plane at right angles to the axis of the pipe, the said two arms and the wheels of each pair being disposed symmetrically with respect to a vertical plane along the axis of the pipe, and the entire assemblage being disposed at higher elevation than the axis of the pipe and adapted to be freely lifted as a unit off the pipe.

9. An appliance for spray-painting a horizontal pipe or the like, including two relatively rigid and downwardly diverging arms, two spray devices respectively supported by the said arms with the axes of the two devices converging downwardly and disposed substantially in a common plane with the axes of the said arms; a four-wheeled carriage having its wheels seated on the pipe and its wheel axes in planes at right angles to the axis of the pipe; the carriage rigidly supporting the said arms at higher elevation than the axis of the pipe and with the said common plane at right angles to the axis of the pipe; each of the arms including an upper arm portion fast with respect to the lifting member and a lower arm portion slidably entering the upper arm portion, each lower arm portion supporting one of the spray devices; and in which the appliance also includes braces spaced from the upper ends of the upper arm portions, each brace connecting the lifting member with one of the upper arm portions.

10. An appliance for spray-painting a horizontal pipe or the like, including two relatively rigid and downwardly diverging arms, two spray devices respectively supported by the said arms with the axes of the two devices converging downwardly and disposed substantially in a common plane with the axes of the said arms; a four-wheeled carriage having its wheels seated on the pipe and its wheel axes in planes at right angles to the axis of the pipe; the carriage rigidly supporting the said arms at higher elevation than the axis of the pipe and with the said common plane at right angles to the axis of the pipe; each of the arms including an upper arm portion fast with respect to the lifting member and a lower arm portion slidably entering the upper arm portion, each lower arm portion supporting one of the spray devices; and means interposed between the said two portions of each arm for latching these arm portions against relative sliding and rotation.

11. An appliance for spray-painting a horizontal pipe or the like, including two relatively rigid and downwardly diverging arms, two spray devices respectively supported by the said arms with the axes of the two devices converging downwardly and disposed substantially in a common plane with the axes of the said arms; a four-wheeled carriage having its wheels seated on the pipe and its wheel axes in planes at right angles to the axis of the pipe; and lifting means fast with respect to the said arms and extending transversely of the pipe above the said devices, by which lifting means the said assemblage may also be propelled longitudinally of the pipe.

12. An appliance for spray-painting a horizontal pipe or the like, comprising as a movable unit a lifting member; two arms fastened to and diverging downwardly from the lifting member; two spray devices respectively supported by the two arms; and a four-wheeled carriage supporting the said arms from the pipe; the carriage including two legs fastened to each arm, and wheels respectively pivoted to the lower ends of the said legs and seated upon the pipe, and means rigidly spacing the wheels by a distance considerably less than the diameter of the pipe, the two arms being disposed in a common plane, and the wheels having their axes in a plane parallel to the aforesaid plane.

13. A pipe-spraying appliance as per claim 12, including means associated with the legs for adjusting the distance between the wheel axes and the connections of the legs to the said arms.

14. A pipe-spraying appliance including a generally bar-like lifting member, two arms diverging downwardly from the lifting member, two spray devices respectively supported by said arms, two clamping members respectively fastened to the said arms, two relatively crossing legs extending through each clamping member and diverging downwardly from the latter, and a wheel pivotally mounted on the lower end of each leg.

15. A pipe-spraying appliance as per claim 12, in which each leg of one pair has a lower portion thereof rigidly connected to a lower portion of a leg of the other pair by a brace.

16. A pipe-spraying appliance as per claim 12, in which the lifting member includes an air pipe and a liquid pipe extending adjacent to each other in the same direction from the juncture of the said arms; an air control valve adjacent to the outer end of the liquid pipe, and a three-way valve adjacent to the outer end of the air pipe, the three-way valve being arranged for venting the air pipe when shutting off the supply of air to that pipe.

17. A pipe-spraying appliance as per claim 12, including handles fastened to the lifting member intermediate of the center and the two ends of the latter.

18. A pipe-spraying appliance as per claim 12, including handles fastened to the lifting member intermediate of the center and the two ends of the latter, the handles extending substantially in a common plane with the said arms.

19. In a pipe-coating appliance, an assemblage as per claim 8, including a fitting connecting the upper ends of the said arms, and a lifting member extending transversely of the pipe above the said devices, by which lifting member the said assemblage may also be propelled longitudinally of the pipe; the lifting member including two pipes extending in a common direction from the said fitting and serving respectively as an air duct and as a liquid material duct, and an auxiliary pipe extending from the fitting in the opposite direction and in alinement with one of the said pipes.

SVEND BRAMSEN.
FRED WAHLIN.